United States Patent [19]

Gardner

[11] Patent Number: 5,599,856
[45] Date of Patent: Feb. 4, 1997

[54] EPOXY RESIN SYSTEMS CONTAINING MODIFIERS

[75] Inventor: Hugh C. Gardner, Somerville, N.J.

[73] Assignee: Amoco Corporation, Chicago, Ill.

[21] Appl. No.: 583,360

[22] Filed: Mar. 1, 1984

[51] Int. Cl.$^6$ ........................................... C08K 5/36
[52] U.S. Cl. ........................................... 523/453; 523/454
[58] Field of Search ............................................. 523/453

[56] References Cited

U.S. PATENT DOCUMENTS

| | | | |
|---|---|---|---|
| 2,935,488 | 5/1960 | Phillips et al. | 528/87 |
| 3,547,881 | 12/1970 | Mueller et al. | 528/87 |
| 4,370,382 | 1/1983 | Salensky | 528/87 |
| 4,517,321 | 5/1985 | Gardner et al. | 528/124 |
| 4,579,885 | 4/1986 | Domeier et al. | 528/98 |
| 4,608,404 | 8/1986 | Gardner et al. | 528/119 |

FOREIGN PATENT DOCUMENTS

82/04256  12/1982  WIPO ..................................... 528/87

OTHER PUBLICATIONS

Hofa et al., *J. Appl. Polymer Science*, 17, 2173–2181 (1973).
Khozin et al., *Polymer Science USSr*, 21, pp. 1938–1948 (1979).

*Primary Examiner*—Charles T. Jordan
*Assistant Examiner*—John R. Hardee
*Attorney, Agent, or Firm*—Richard J. Schlott; Stephen L. Hensley

[57] ABSTRACT

Described herein are compositions useful for the preparation of high modulus matrix resins for composites comprising a cycloaliphatic epoxide and a particular modifier.

16 Claims, No Drawings

EPOXY RESIN SYSTEMS CONTAINING MODIFIERS

BACKGROUND OF THE INVENTION

Advanced composites are high strength, high modulus materials which are finding increasing use as structural components in aircraft, automotive, and sporting goods applications. Typically they comprise structural fibers such as carbon fibers in the form of woven cloth or continuous filaments embedded in a thermosetting resin matrix.

Composite properties depend on both the matrix resin and the reinforcement. In unidirectional carbon fiber composites, important mechanical properties include longitudinal strength and modulus, transverse tensile strength and modulus, and longitudinal compressive strength. The matrix affects all of these properties, but has the greatest effect on compressive strength and transverse tensile properties. High composite compressive strengths and transverse tensile moduli require that the matrix have a high modulus.

State-of-the-art epoxy matrix resin systems in advanced composites are typically based on N,N,N',N'-tetraglycidyl 4,4-diaminophenyl methane and 4,4-diaminodiphenyl sulfone. These resins produce unreinforced castings which have tensile strengths of about 8,000 psi and tensile moduli of 500,000 to 550,000 psi. Unidirectional composites containing 60 volume fraction fiber made with these matrix resins typically have transverse tensile strengths of 5,000 to 7,000 psi and transverse tensile moduli of 1.0 to 1.4 million psi. Higher transverse properties are very desirable for applications such as pressure vessels. Improved compressive properties are desirable for structures subjected to high compressive loads, such as sucker rods for oil wells.

Epoxy resin systems affording higher matrix properties than those in state-of-the-art formulations are known. For example, compositions comprising bis(2,3-epoxycyclopentyl) ether and m-phenylenediamine produce unreinforced castings with superior tensile strengths (e.g. 14 to 17.000 psi) and tensile moduli (650 to 670,000 psi).

Related epoxy compositions are described in U.S. Pat. No. 3,398,102, which discloses tacky, curable copolymers formed by reacting bis(2,3-epoxycyclopentyl) ether with aliphatic polyols such as ethylene glycol. Castings made by curing these compositions with m-phenylenediamine have some of the highest tensile strengths (16 to 18,000 psi) and tensile moduli (700 to 850,000 psi) of any thermosetting material. However, in commercial production, these epoxy compositions require long reaction times and complicated vacuum distillation and water washing steps as part of their production processes. Moreover, the yield of the final resin is low, typically 40 to 50%.

It has now been found that epoxy compositions which produce unreinforced castings with a high level of tensile properties and a high heat deflection temperature can be obtained by blending a cycloaliphatic epoxy resin such as bis(2,3-epoxycyclopentyl) ether with a specific group of modifiers. The blend of cycloaliphatic epoxy resin and modifier produces castings with properties comparable to those obtained with the compositions described in U.S. Pat. No. 3,398,102. This process is simpler and affords the final product in higher yields than that used to make copolymers of bis(2,3-epoxycyclopentyl) ether and aliphatic polyols.

In the prior art, compositions have been prepared with glycidyl type epoxy resins such as bisphenol-A epoxy resins and modifiers which are described as antiplasticizers. Hata et al in Journal of Applied Polymer Science, Volume 17, pages 2173 to 2181 (1973) and Volume 21, pages 1257 to 1266 (1977) disclosed that polychlorinated biphenyls, dibutyl phthalate and the phenol adducts of bisphenol-A epoxy resins are effective antiplasticizers in a bisphenol-A epoxy resin cured with ethylenediamine. Also, Khozin et al in Polymer Science USSR, Volume 21, pages 1938 to 1948 (1980) described modifiers such as polyhalogeneated biphenyls, azobenzene, hydroxy diphenyl, carbon tetrachloride, tricresyl phosphate in bisphenol-A epoxy resins cured with 4,4-diaminodiphenyl methane. P. D. McLean et al in The British Polymer Journal, Volume 15, March 1983, pages 66 to 70 described additives for bisphenol-A epoxy resins cured with 4,4-diaminodiphenyl methane. The additives are described as fortifiers. They are reaction products between a substituted aromatic amine or amide and a monoepoxide or diepoxide.

However, there are no references to the use of any of the above modifiers with cycloaliphatic epoxides. None of the modified aromatic epoxy resin compositions in the prior art show the combination of tensile modulus greater than 680, 000 psi, tensile strength above 10,000 psi with a heat deflection temperature above 100° C. The compositions of this invention, when cured with selected aromatic amines, meets all these requirements.

THE INVENTION

A composition useful as a high modulus matrix resin for composites comprising:

(a) a cycloaliphatic epoxide containing two or more epoxide groups, and (b) a modifier selected from one or more of the following:

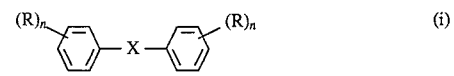 (i)

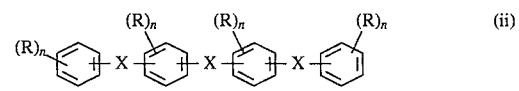 (ii)

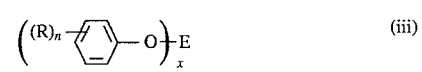 (iii)

 (iv)

wherein X is selected from SO$_2$, SO,

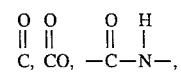

O, a direct bond or C(CF$_3$)$_2$, R is selected from alkyl of 1 to 4 carbon atoms,

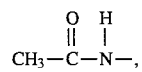

aryl, flourine, chlorine or bromine, n is 0 to 4, R' is selected from the residue of a mono or a diamine, a phenolic compound containing 1 to 3 phenolic hydroxyl groups or an aminophenol, E is the residue of a mono or a diepoxide, x is 1 or 2: y is 1 to 10 and c is 1 to 4, with the proviso that the epoxy equivalent weight of modifiers (iii) and (iv) is greater than 300 grams/mole.

The preferred modifiers are of the following formulae:

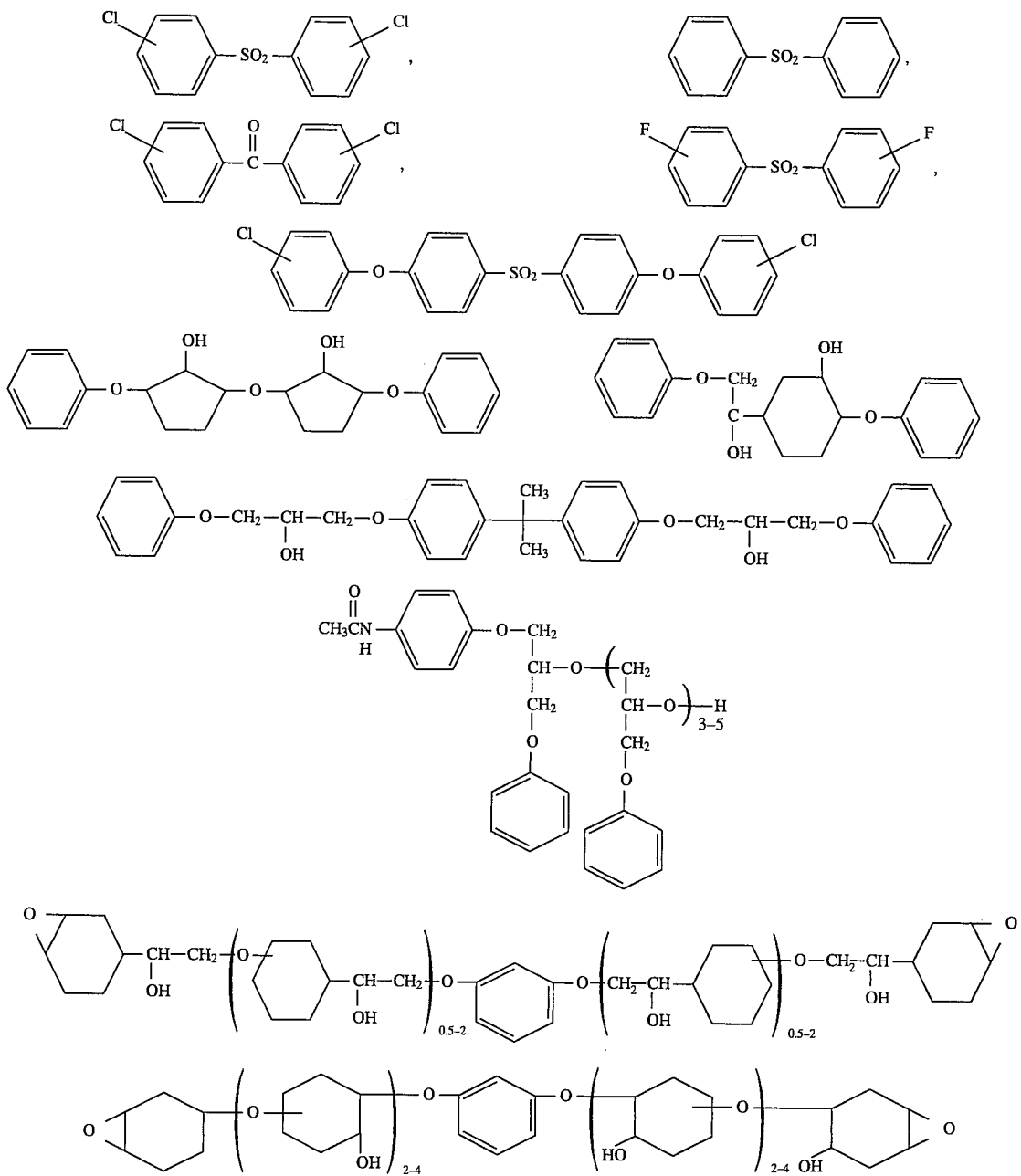

Although the modifiers are depicted by one structure they may in fact be a mixture of compounds.

The modifiers depicted by formula (i) are generally commercially available compounds. Many of those of formula (ii) may be prepared by reacting the compounds of (i) with phenolic compounds. For example, the following compound

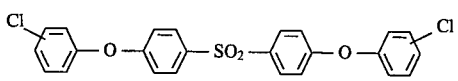

is prepared by reacting 2 moles of chlorophenol with one mole of 4,4-dichlorodiphenyl sulfone in the presence of base at elevated temperatures in a dipolar aprotic solvent. A typical base is potassium carbonate, a typical solvent is dimethyl sulfoxide. and a typical reaction temperature is 150° C.

The modifiers of formula (iii) are prepared by reacting phenolic compounds with mono- or diepoxides using a stoichiometry of about one mole of hydroxyl group per mole of epoxide group. For example, a mixture of 2.2 moles of phenol was heated at 130° C. with 1.2 moles of bis(2,3-epoxycyclopentyl) ether for 7 hours in the presence of a catalytic amount of N,N-dimethylbenzylamine. Under these conditions substantially all of the epoxy groups reacted.

The modifiers of formula (iv) are prepared, for example, by reacting a phenolic compound, such as resorcinol, with a diepoxide such as vinyl cyclohexene diepoxide in a molar ratio of from 2 to 8 moles of vinyl cyclohexene diepoxide per mole of resorcinol at a temperature of from about 100 to about 140° C. The mixture is heated until the epoxy equivalent weight exceeds 300 grams/mole due to the reaction of the phenolic hydroxyl groups with epoxides, as well as epoxide homopolymerization. With monoepoxides such as phenyl glycidyl ether, a molar ratio of epoxy groups to phenolic hydroxyl groups may be preferably between 2 and 4. In these systems, the epoxy groups are consumed by epoxy homopolymerization as well as by the reaction of phenolic hydroxyl groups with epoxy groups.

The reaction products of (iii) and (iv) are normally complex mixtures. In these mixtures at least 60% of all the phenolic OH and aromatic NH groups are reacted.

The cycloaliphatic epoxides of this invention are prepared by epoxidation of dienes or polyenes. Resins of this type include bis(2,3-epoxycyclopentyl)ether, I,

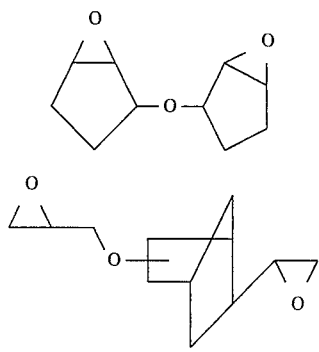

reaction products of I with ethylene glycol which are described in U.S. Pat. No. 3,398,102, 5(6)-glycidyl-2-(1,2-epoxyethyl)bicyclo[2.2.1]heptane, II and dicyclopentadiene diepoxide. Commercial examples of these epoxides include vinylcyclohexene dioxide, e.g., "ERL-4206" (obtained from Union Carbide Corp.), 3,4-epoxycyclohexylmethyl 3,4-epoxycyclohexane carboxylate, e.g., "ERL-4221" (obtained from Union Carbide Corp.), 3,4-epoxy-6-methylcyclohexylmethyl 3,4-epoxy-6-methylcyclohexane carboxylate, e.g., "ERL-4201" (obtained from Union Carbide Corp.), bis(3,4-epoxy-lcyclohexylmethyl) adipate, e.g., "ERL-4299" (obtained from Union Carbide Corp.), dipentene dioxide, e.g., "ERL-4269" (obtained from Union Carbide Corp.), 2-(3,4-epoxycyclohexyl-5,5-spiro-3,4-epoxy)cyclohexane meta-dioxane, e.g.. "ERL-4234" (obtained from Union Carbide Corp.), and epoxidized poly-butadiene, e.g., "Oxiron 2001" (obtained from Union Carbide Corp.).

Other suitable cycloaliphatic epoxides include those described in U.S. Pat. Nos. 2,750,395; 2,890,194; and 3,318,822 which are incorporated herein by reference, and the following:

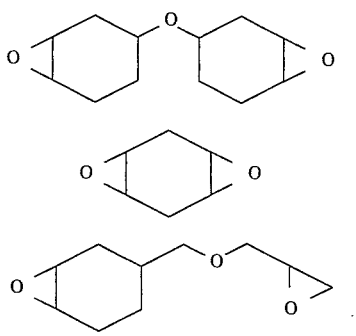

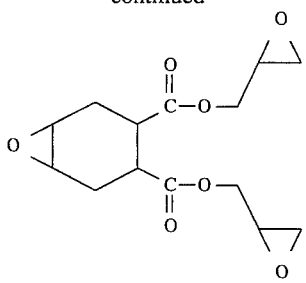

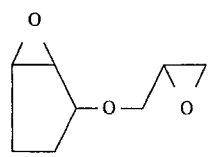

Other suitable epoxides include:

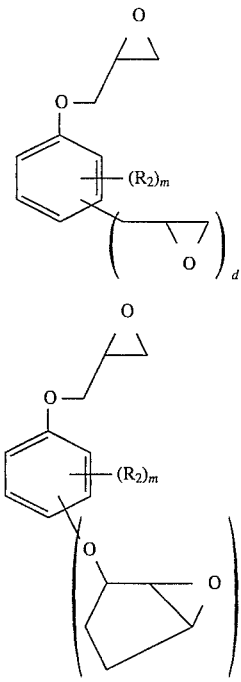

where d is 1 to 4, m is (5-d), and $R_2$ is H, halogen, or $C_1$ to $C_4$ alkyl.

Coepoxides may be used with the cycloaliphatic epoxides of this invention. These coepoxides are called polyglycidyl compounds. They contain a plurality of epoxide groups derived from the reaction of a polyfunctional active hydrogen containing compound with an excess of an epihalohydrin under basic conditions. When the active hydrogen compound is a polyhydric alcohol or phenol, the resulting epoxide resin contains glycidyl ether groups. A preferred group of polyglycidyl compounds are made via condensation reactions with 2,2-bis(4-hydroxyphenyl)propane, also known as hisphenol A, and have structures such as III:

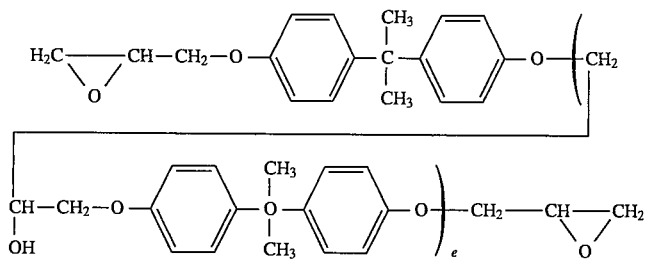
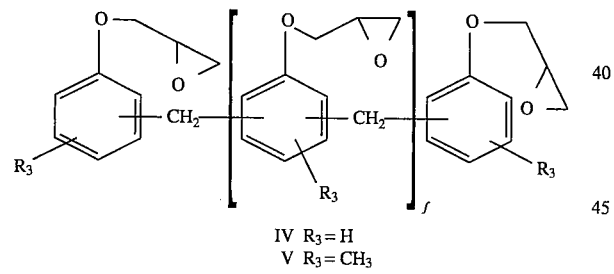

III where e has a value from about 0 to about 15. These epoxides are bisphenol-A epoxy resins. They are available commercially under the trade names such as "Epon 828", "Epon 1001", and "Epon 1009" from Shell Chemical Co., and as "DER 331", and "DER 334" from Dow Chemical Co. The most preferred bisphenol A epoxy resins have an "e" value between 0 an 10.

Polyepoxides which are polyglycidyl ethers of 4,4-dihydroxydiphenyl methane, 4,4-dihydroxydiphenyl sulfone, 4,4-biphenol, 4,4-dihydroxydiphenyl sulfide, phenolphthalein, resorcinol, 4,2-biphenol, or tris(4-hydroxyphenyl) methane and the like, are useful in this invention. In addition, EPON 1031 ( a tetraglycidyl derivative of 1,1,2,2-tetrakis(hydroxyphenyl)ethane from Shell Chemical Company), and Apogen 101, (a methylolated hisphenol A resin From Schaefer Chemical Co.) may also be used. Halogenated polyglycidyl compounds such as D.E.R. 580 (a brominated bisphenol A epoxy resin from Dow Chemical Company) are also useful. Other suitable epoxy resins include polyepoxides prepared from polyols such as pentaerythritol, glycerolo butanediol, or trimethyloloporpane and an epihalohydrin.

Polyglycidyl derivatives of phenol-formaldehyde novolaks such as IV where f=0.1 to 8 and cresol-formaldehyde novolaks such as V where f=0.1 to 8 are also useable.

IV $R_3 = H$
V $R_3 = CH_3$

The former are commercially available as D.E.N. 431, D.E.N. 438, and D.E.N. 485 from Dow Chemical Company. The latter are available as, for example, ECN 1235, ECN 1273, and ECN 1299 (obtained from Ciba-Geigy Corporation, Ardsley, N.Y.). Other epoxidized novolaks such as SU-8 (obtained from Celanese Polymer Specialties Company, Louisville, Ky.) are also suitable.

Other polyfunctional active hydrogen compounds besides phenols and alcohols may be used to prepare thepolyglycidyl adducts of this invention. They include amines, aminoalcohols and polycarboxylic acids.

Adducts derived from amines include N,N-diglycidyl aniline, N,N-diglycidyl toluidine, N,N,N',N'-tetraglycidylxylylene diamine, (i.e., VI) N,N,N',N'-tetraglycidyl-bis(methylamino) cyclohexane (i.e. VII), N,N,N',N'-tetraglycidyl-4,4'-diaminodiphenyl methane, (i.e. VIII) N,N,N', N'-tetraglycidyl-3,3'-diaminodiphenyl sulfone, and N,N'-dimethyl-N,N'-diglycidyl-4,4'-diaminodiphenyl methane. Commercially available resins of this type include Glyamine 135 and Glyamine 125 (obtained from F.I.C. Corporation, San Francisco, Calif.), Araldite MY-720 (obtained from Ciba Geigy Corporation) and PGA-X and PGA-C (obtained from The Sherwin-Williams Co., Chicago, Ill.).

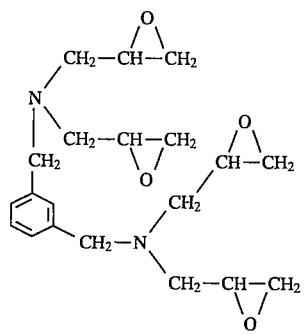

VI

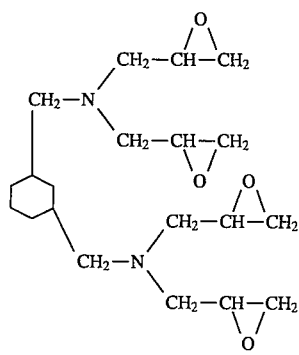

VII

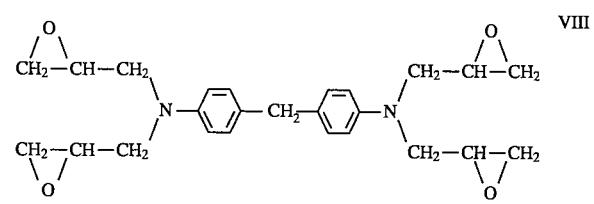

VIII

Suitable polyglycidyl adducts derived from aminoalcohols include O,N,N-triglycidyl-4-amino-phenol, available as Araldite 0500 or Araldite 0510 (obtained from Ciba Geigy Corporation) and O,N,N-triglycidyl-3-aminophenol (available as Glyamine 115 from F.I.C. Corporation).

Also suitable for use herein are the glycidyl esters of carboxylic acids. Such glycidyl esters include, for example, diglycidyl phthalate, diglycidyl terephthalate, diglycidyl isophthalate, and diglycidyl adipate. There may also be used polyepoxides such as triglycidyl cyanurates and isocyanurates, N,N-diglycidyl oxamides, N,N'-diglycidyl derivatives of hydantions such as "XB 2793" (obtained from Ciba Geigy Corporation), diglycidyl esters of cycloaliphatic dicarboxylic acids, and polyglycidyl thioethers of polythiols.

Other epoxy-containing materials are copolymers of acrylic acid esters of glycidol such as glycidyl acrylate and glycidyl methacrylate with one or more copolymerizable vinyl compounds. Examples of such copolymers are 1:1 styrene-glycidyl methacrylate, 1:1 methyl methacrylate-glycidyl acrylate and 62.5:24:13.5 methyl methacrylate:ethyl acrylate:glycidyl methacrylate.

Silicone resins containing epoxy functionality, e.g., 2,4,6,8,10-pentakis [3-(2,3-epoxypropoxy)propyl]-2,4,6,8,10-pentamethyl-cyclopentasiloxane and the diglycidyl ether of 1,3-bis-(3-hydroxypropyl)tetramethyldisiloxane are also useable.

Reactive diluents containing one epoxide group such as t-butylphenyl glycidyl ether, may also be used. The reactive diluent may comprise up to 25 percent by weight of the epoxide component.

The reactive diluent and coepoxide are used in amounts of up to 40, preferably 30 percent by weight.

The preferred epoxy resins are bis(2,3-epoxycyclopentyl) ether, vinyl cyclohexene diepoxide, 2-(3,4-epoxycyclohexyl-5,5-spiro-3,4-epoxy)cyclohexane meta-dioxane, a diepoxide of allyl cyclopentenyl ether, 1,4-cyclohexadiene diepoxide, and 3,4-epoxycylcohexylmethyl 3,4-epoxycyclohexane carboxylate.

The hardeners which may be used in the composition of this invention are selected from aromatic amines, aliphatic amines and dicyandiamide. These include one or more of the following: 4,4-diaminodiphenyl ether, 4,4-diaminodiphenyl methane, 3,3-diaminodiphenyl methane, 4,4-diaminodiphenyl sulfone, 3,3-diaminodiphenyl sulfone, 3,3-diaminobenzophenone, m-phenylenediamine, p-phenylenediamine, 4,4-diaminodiphenylpropane, 4,4-diaminodiphenyl sulfide, diethyltoluenediamine, 1,4-bis(m-aminophenoxy)benzene, 1,4-bis(m-aminophenoxy)benzene, ethylenediamine, 1,3-bis(p-aminophenoxy) benzene, adducts of epoxy resins with the above diamines, such as the adduct formed by reacting one mole of a liquid bisphenol-A epoxy resin with 2 to 4 moles of m-phenylenediamine by itself or in combination with 4,4-diaminodiphenyl methane or the adducts of a bisphenol-A epoxy resin with a molar excess of 4,4-diaminodiphenyl sulfone, as described in U.S. Pat. No. 4,330,659. 4,4'-bis(3-aminophenoxy)diphenyl sulfone, 2,2-bis(4-aminophenoxyphenyl)propane and trimethylene glycol di-para-aminobenzoate.

The preferred hardeners are m-phenylene diamine, diaminodiphenyl methane and low melting mixtures of m-phenylenediamine and diaminodiphenyl methane, 2,2-bis(4-aminophenoxyphenyl)propane and the adduct formed by reacting one mole of a liquid bisphenol-A epoxy with 2 to 4 moles of m-phenylenediamine.

The compositions of this invention may optionally contain a thermoplastic polymer. These materials have beneficial effects on the viscosity and film strength characteristics of the epoxy/antiplasticizer/hardener mixture.

The thermoplastic polymers used in this invention include polyarylethers of formula IX which are described in U.S. Pat. Nos. 4,108,837 and 4,175,175, $$+O-R_4-O-R_5+_g \qquad \text{IX}$$

wherein $R_4$ is a residuum of a dihydric phenol such as hisphenol A, hydroguinone, resorcinol, 4,4-biphenol, 4,4'-dihydroxydiphenyl sulfone, 4,4'-dihydroxy-3,3' 5,5'-tetramethyldiphenyl sulfide 4,4'-dihydroxy-3',3',5,5'-tetramethyldiphenyl sulfone and the like. $R_5$ is a residuum of a benzenoid compound susceptible to nucleophilic aromatic substitution reactions such as 4,4'-dichlorodiphenyl sulfone, 4,4'-difluorobenzophenone, and the like. The average value of a is from about 8 to about 120.

These polymers may have terminal groups which react with epoxy resins, such as hydroxyl or carboxyl, or terminal groups which do not react.

Other suitable polyarylethers are described in U.S. Pat. No. 3,332,209.

Also suitable are polyhydroxyethers of formula X.

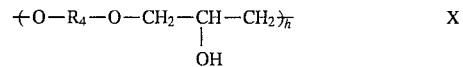

where $R_4$ has the same meaning as for Formula IX and the average value of h is between about 8 and about 300: and polycarbonates such as those based on bisphenol A, tetramethyl bisphenol A, 4,4'-dihydroxydiphenyl sulfone, 4,4'-dihydroxy-3,3',5,5'-tetramethyldiphenyl sulfone, hydroquinone, resorcinol, 4,4'-dihydroxy-3,3',5,5'-tetramethyl diphenyl sulfide, 4,4'biphenol, 4,4'-dihydroxydiphenyl sulfide, phenolphthalein, 2,2,4,4-tetramethyl-1,3-cyclobutane diol, and the like. Other suitable thermoplastics include poly (ε-caprolactone); polybutadiene; polybutadiene/acrylonitrile copolymers, including those optionally containing amine, carboxyl, hydroxy, or —SH groups; polyesters, such as poly(butylene terephthalate); poly(ethylene terephthalate); polyetherimides such as the Ultem resins (obtained from the General Electric Company); acrylonitrile/butadiene/styrene terpolymers, polyamides such as nylon 6, nylon 6,6, nylon 6,12, and Trogamid T (obtained from Dynamit Nobel Corporation); poly(amide imides) such as Torlon poly(amide imide) (obtained from Amino Chemical Corporation, Napierville, Ill.); polyolefins, polyethylene oxide; poly(butyl methacrylate); impact-modified polystyrene; sulfonated polyethylene; polyarylates such as those derived from bisphenol A and isophthalic and terephthalic acid; poly(2,6-dimethyl phenylene oxide); polyvinyl chloride and its copolymers; polyacetals; polyphenylene sulfide and the like.

The composition may additionally contain an accelerator to increase the rate of cure. Accelerators which may be used herein include Lewis acid:amine complexes such as $BF_3$.monoethylamine, $BF_3$.piperidine, $BF_3$.2-methylimidazole; amines, such as imidazole and its derivatives such as 4-ethyl-2-methylimidazole, 1-methylimidazole, 2-methylimidazole; N,N-dimethylbenzylamine; acid salts of tertiary amines, such as the p-toluene sulfonic acid:imidazole complex, salts of trifluoro methane sulfonic acid, such as FC-520 (obtained from 3M Company), organophosphonium halides and phenolic accelerators such as 4-hydroxyacetanilide. bisphenol-A and 4,4'-dihydroxydiphenyl sulfone. These accelerators are generally used in amounts of from 0.1 to about 3 weight percent based on the epoxy resin.

The compositions of this invention may include a structural fiber. The structural fibers which are useful in this invention include carbon, graphite, glass, silicon carbide. poly(benzothiazole), poly(benzimidazole), poly(benzoxazole), alumina, titania, boron, and aromatic polyamide fibers, or combinations of these. These fibers are characterized by a tensile strength of greater than 100,000 psi, a tensile modulus of greater than two million psi, and a decomposition temperature of greater than 200° C. The fibers may be used in the form of continuous tows (1000 to 400,000 filaments each), woven cloth, whiskers, chopped fiber or random mat. The preferred fibers are carbon fibers, aromatic polyamide fibers, such as Kevlar 49 fiber (obtained from E. I. DuPont de Nemours, Inc., Wilmington, Del.). and silicon carbide fibers.

The composition contains from about 20 to about 90, preferably from about 40 to about 85 percent by weight of cycloaliphatic epoxide, from about 1 to about 80, preferably from about 5 to about 60 percent by weight of the modifier (component b). The composition may contain from about 5 to about 80, preferably from about 8 to about 60 percent by weight of hardener. If used. the thermoplastic polymer is present in amounts of up to about 20, preferably up to about 15 percent by weight. The structural fiber may be present in amounts of up to about 85, preferably from about 20 to about 80 percent by weight.

At a temperature of 85° C., the mixture of the cycloaliphatic epoxy resin and modifier is homogeneous.

Preimpregnated reinforcement may be made from the compositions of this invention by combining epoxy resins, modifier, hardener, and optionally thermoplastic polymer with the structural fiber.

Preimpregnated reinforcement may be prepared by several techniques known in the art, such as wet winding or hot melt.

In the hot melt process partially advanced resin mixtures are coated as a thin film onto a silicone coated release paper. Prepreg is made by passing a ribbon of fiber between two plies of coated release paper through a prepreg machine, where under the action of heat and pressure, the resin mixture is transferred from the paper to the fibers. Prepreg made by this process is typically taken up on a spool. It is used within a few days or may be stored for months at 0° F.

During prepreg manufacture, the resin system "B-stages", or partially advances.

Composites may be prepared by curing preimpregnated reinforcement using heat and pressure. Vacuum bag/autoclave cures work well with these compositions. Laminates may also be prepared via wet layup followed by compression molding, resin transfer molding, or by resin injection, as described in European Patent Application 0019149 published Nov. 26, 1980. Typical cure temperatures are 100° F. to 500° F. preferably 180° F. to 450° F.

The compositions of this invention are well suited for filament winding. In this composite fabrication process, continuous reinforcement in the form of tape or tow—either previously impregnated with resin or impregnated during winding—is placed over a rotating and removable form or mandrel in a previously determined pattern. Generally the shape is a surface of revolution and contains end closures. When the proper number of layers are applied, the wound form is cured in an oven or autoclave and the mandrel removed.

The compositions of this invention may be used as aircraft parts such as wing skins, wing-to-body fairings, floor panels, flaps, radomes; as automotive parts such as driveshafts, bumpers, and springs; and as pressure vessels, tanks and pipes. They are also suitable for sporting goods applications such as golf shafts, tennis rackets, and fishing rods.

In addition to structural fibers, the composition may also contain particulate fillers such as talc, mica, calcium carbonate, aluminum trihydrate, glass microballoons, phenolic thermospheres, and carbon black. Up to half of the weight structural fibers in the composition may be replaced by filler. Thixotropic agents such as fumed silica may also be used.

Further, the compositions may be used in adhesives, potting and encapsulation, and coating applications.

EXAMPLES

The following examples serve to give specific illustrations of the practice of this invention but they are not intended in any way to limit the scope of this invention.

Epoxy equivalent weights (EEW) were measured by dissolving samples in a 0.2M solution of tetraethylammonium bromide in a 56/44 (volume) chlorobenzene/acetic acid solution and titrating with 0.1N perchloric acid in acetic acid using crystal violet as an end point indicator.

EXAMPLE 1

A 3 liter, 4-necked flask equipped with a paddle stirrer, Thermo-O-Watch Controller, an inlet and outlet for nitrogen, and an electric heating mantle was charged with 1152 g (8 moles) of vinyl cyclohexene diepoxide. The contents were heated to a temperature of 100° C. and treated with four 55 g portions (2 moles total) of resorcinol over a 75 minute period. The mixture was heated for 4 hours at 100° C. Then, a distillation head was installed on the flask. The mixture was heated at 120° C. for 5 hours under a vacuum of about 10 mm of mercury as 397 g of vinyl cyclohexene diepoxide was distilled from the mixture. The viscous residue in the flask was poured into a teflon sheet, allowed to solidify, and then broken up into small pieces. The yield was 1055 g. The product had an epoxy equivalent weight of 350 g/mole. Analysis of the product by liquid chromatography indicated that it consisted of a mixture of oligomers formed from the reaction of resorcinol with the diepoxide. Less than 5 percent by weight of the final product was unreacted vinyl cyclohexene diepoxide.

EXAMPLE 2

A 3-necked, 1 liter flask equipped as in Example 1 was charged with 207 g (2.2 moles) of molten phenol and 220 g (1.2 moles) of bis(2,3-epoxycyclopentyl) ether. The mixture was purged with nitrogen, heated to a temperature of 80° C., and treated with 6.0 ml of N,N-dimethylbenzylamine. Then it was heated to a temperature of 130° C. and held at that temperature for 4.5 hours. After an additional 6.0 ml of N,N-dimethylbenzylamine was added, the temperature was raised to 140° C. and held there for 2.5 hours. The mixture was then cooled to 42° C. and diluted with 600 ml of methylene chloride. This solution was transferred to a Morton flask with a paddle stirrer, washed successively with 500 g of saturated aqueous sodium carbonate solution, and 4 portions (500 ml each) of distilled water, dried over sodium sulfate, and filtered. Methylene chloride was removed from the filtrate by feeding it through a 2 inch diameter wiped film evaporator operated at a temperature of 80° C. under a vacuum of 27 inches of mercury. The residue, a brown viscous oil, weighed approximately 350 g. It had an epoxy equivalent weight of 919 g/mole. Analysis by liquid chromatography showed that it was primarily the two mole adduct of phenol/bis(2,3-epoxycyclopentyl) ether.

The following Examples and Control describe formulations and properties of unreinforced castings.

EXAMPLE 3 THROUGH 10 AND CONTROL

The compositions of Examples 1 and 2 were used to make unreinforced castings. They were blended with the amounts of bis(2,3-epoxycyclopentyl) ether shown in Table I to form homogeneous solutions. In the same manner a casting was prepared from bis(2,3-epoxycyclopentyl) ether, m-phenylenediamine, a reaction product of phenyl glycidyl ether and 4-hydroxyacetanilide. The latter was obtained from Uniroyal Canada (Guelph, Ontario, Canada) as "Fortifier I". This material contained approximately 80 percent by weight of adducts of 4-hydroxyacetanilide and phenyl glycidyl ether (1:4.3 molar ratio), 12 percent unreacted phenyl glycidyl ether and 8 percent unreacted 4-hydroxyacetanilide. The epoxy equivalent weight of Fortifier I was about 900 g/mole. This formulation is Example 3.

Table I lists formulations containing the compositions of Examples 1 and 2 and the phenyl glycidyl ether/4-hydroxyacetanilide reaction product. Casting properties are also given, as is data for the Control, which contains no modifier. All castings were made with a 1.1:1.0 NH/epoxide stoichiometry. The general procedure for making castings was the following: bis(2,3-epoxycyclopentyl) ether and the modifier were changed to a 3-neck flask equipped with a paddle stirrer. The contents of the flask were heated to 85° C. and stirred. The amine hardener was added to this solution as a fine solid. It dissolved in about two minutes. The resulting solution was subjected to a vacuum of about 25 inches of mercury for three minutes with agitation, followed by two minutes without agitation. It was then poured into a glass mold with a cavity of dimensions ⅛×8×8 inches, and cured with a programmed heating cycle.

Typical castings weighed 120 to 170 g and had dimensions of ⅛×8×5 to 8 inches. They were hard and transparent.

Castings were tested to determine tensile properties and heat deflection temperature. Tensile properties were measured according to ASTM D-638 using a Type 1 dogbone specimen. Heat deflection temperatures were measured according to ASTM D-648 (264 psi stress).

It is clear that the compositions of this invention afford unreinforced castings with significantly higher tensile moduli than the Control.

Unreinforced castings were also made using 4,4'-difluorodiphenyl sulfone, 4,4'-dichlorodiphenyl sulfone and 4,4'-bis(4-chlorophenoxyphenyl)sulfone as modifier. Formulations and casting properties are shown in Table II.

Again, increased tensile moduli are observed in unreinforced castings containing these modifiers. In addition heat deflection temperatures remain at a high level.

It should be noted that modulus is a bulk property of the material, unlike strength and elongation, which are sensitive to defects in the sample. Thus and increased matrix modulus should result in an increased composite modulus.

TABLE I

PROPERTIES OF UNREINFORCED CASTINGS CURED WITH M-PHENYLENEDIAMINE (MPDA)[a]

| RESIN FORMULATION | 3 | 4 | 5 | 6 | 7 | Control |
|---|---|---|---|---|---|---|
| Casting Example | | | | | | |
| Modifier | Phenol/bis(2,3-epoxycyclopentyl) ether Adduct | Phenol/bis(2,3-epoxycyclopentyl) ether Adduct | Resorcinol/vinyl cyclohexene diepoxide Adduct | Resorcinol/vinyl cyclohexene diepoxide Adduct | Phenyl glycidyl ether/4-hydroxyacetanilide reaction product | None |
| Example for Preparation of Modifier. | 2 | 2 | 1 | 1 | — | — |
| Modifier, wt (g) | 21.7 | 40.0 | 37.8 | 56.5 | 40.0 | — |
| Bis(2,3-epoxycyclopentyl) ether, wt. (g) | 90.7 | 90.7 | 75.0 | 56.5 | 90.7 | 110 |
| MPDA, wt. (g) | 29.3 | 29.3 | 27.5 | 23.1 | 29.3 | 35.5 |
| Casting Properties | | | | | | |
| Tensile Strength ($10^3$ psi) | 14.3 | 17.0 | 11.8 | 12.2 | 15.0 | 17.0 |
| Tensile Modulus ($10^3$ psi) | 737 | 811 | 755 | 826 | 868 | 666 |
| Elongation (%) | 2.2 | 2.4 | 1.6 | 1.6 | 1.9 | 4.2 |
| Heat Deflection Temp. (°C.) | 167 | 140 | 177 | 159 | 132 | 187 |

[a] All castings cured with 110% —NH/epoxide stoichiometry. Cure schedule: 5 hr. at 85° C., 85° to 120° C. at 1° C./min., hold 4 hr. at 120 C., 120° to 160° C. at 1° C./min., hold 6 hr. at 160° C.

TABLE II

PROPERTIES OF UNREINFORCED CASTINGS CURED WITH M-PHENYLENEDIAMINE (MPDA)[a]

| RESIN FORMULATION | 8 | 9 | 10 | Control |
|---|---|---|---|---|
| Casting | | | | |
| Modifier | 4,4'-difluoro-diphenyl sulfone | 4,4-dichloro-diphenyl sulfone | 4,4'-Bis(4-chloro-phenoxy) diphenyl sulfone | None |
| Modifier wt. (g) | 21.7 | 21.7 | 21.7 | — |
| Bis(2,3-epoxy-cyclopentyl) ether wt. (g) | 92 | 90.7 | 90.7 | 110 |
| MPDA wt. (g) | 29.3 | 29.3 | 29.3 | 35.5 |
| Casting Properties | | | | |
| Tensile Strength ($10^3$ psi) | 14.5 | 16.7 | 13.5 | 17.0 |
| Tensile Modulus ($10^3$ psi) | 739 | 698 | 680 | 666 |
| Elongation (%) | 2.7 | 4.5 | 2.4 | 4.2 |
| Heat Deflection Temp (°C.) | 168 | 173 | 173 | 187 |

[a]All castings cured with 110% —NH/epoxide stoichiometry. Cure schedule: 5 hr. at 85° C. 85° to 120° C. at 1° C./min., hold 4 hr. at 120° C., 120 to 160° C. at 1° C./min., hold 6 hr. at 160° C.

EXAMPLE 11

Example 11 describes the preparation of a unidirectional carbon fiber composite using the composition of this invention. The prepreg is made using a polyacrylonitrile-based carbon fiber with a tensile strength of 6.6×10⁵ psi and a tensile modulus of 36×10⁶ psi.

A carbon fiber tow containing 6000 filaments is drawn through a resin bath containing the resin formulation shown in Example 4. The impregnated fiber is wound on an 8 inch square frame to a thickness of approximately ⅛ inch. The impregnated fiber in the frame contains approximately 35 percent by weight of resin. The resin is cured by placing the frame in an oven and heating with a programmed cure cycle. The cure cycle is 5 hours at 85° C., 85° to 120° C. at 1° C./minute, hold 4 hours at 120° C., 120° C. to 160° C. at 1° C./minute, hold 6 hours at 160° C. The frame is removed from the oven and the cured carbon fiber composite is removed from the frame. The composite is tested for transverse strength and modulus according to ASTM D-3039. A transverse tensile modulus in excess of 1.5 million psi is obtained.

What is claimed is:

1. A composition comprising:
   (a) a cycloaliphatic epoxide containing two or more epoxide groups, and
   (b) a modifier selected from the group consisting of compounds of the formula

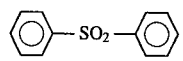

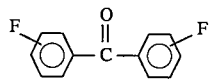

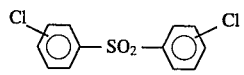

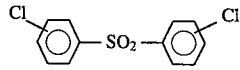

-continued

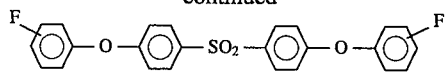

2. A composition as defined in claim 1 wherein the cycloaliphatic epoxide is selected from one or more of the following:

vinylcyclohexene diepoxide, 3,4-epoxycyclohexylmethyl 3,4-epoxycyclohexane carboxylate, 3,4-epoxy-6-methylcyclohexylmethyl 3,4-epoxy-6-methylcyclohexane carboxylate, dipentene dioxide, 2-(3,4-epoxycyclohexyl-5,5-spiro-3,4-epoxy)cyclohexane meta-dioxane or epoxidized poly-butadiene.

3. A composition as defined in claim 1 which contains up to 40 percent by weight of a coepoxy resin.

4. A composition as defined in claim 1 which contains a hardener.

5. A composition as defined in claim 4 wherein the hardener is selected from one or more of the following: 4,4-diaminodiphenyl ether, 4,4-diaminodiphenyl methane, 3,3-diaminodiphenyl methane, 4,4-diaminodiphenyl sulfone, 3,3-diaminodiphenyl sulfone, diethyltoluenediamine, 3,3-diaminobenzophenone, m-phenylenediamine, p-phenylenediamine, 4,4-diaminodiphenylpropane, 4,4-diaminodiphenyl sulfide, ethylenediamine, 1,4-bis(m-aminophenoxy)benzene, 1,4-bis(m-aminophenoxy)benzene, 1,3-bis(p-aminophenoxy)benzene, the adduct formed by reacting one mole of a liquid bisphenol-A epoxy resin with 2 to 4 moles of m-phenylenediamine by itself or in combination with 4,4-diaminodiphenyl methane or the adducts of a bisphenol-A epoxy resin with a molar excess of 4,4-diaminodiphenyl sulfone, 4,4 bis(3-aminophenoxy) diphenyl sulfone, 2,2 bis(4-aminophenoxyphenyl)propane, trimethylene glycol di-para-aminobenzoate, and dicyandiamide.

6. A composition as defined in claim 1 which contains a structural fiber selected from carbon, graphite, glass, silicon carbide, poly(benzothiazole), poly(benzimidazole), poly(benzoxazole), alumina, titania, boron, and aromatic polyamides.

7. A composition as defined in claim 1 which contains a thermoplastic polymer.

8. A composition as defined in claim 7 wherein the thermoplastic polymer is selected from one or more of a poly(aryl ether), a polyhydroxyether, a polycarbonate, a poly(ε-caprolactone), a polybutadiene/acrylonitrile copolymer, a polyester, an acrylonitrile/butadiene/styrene copolymer, a polyamide, a poly(amide imide), a polyolefin, a polyethylene oxide, a polybutyl methacrylate, an impact-modified polystyrene, a sulfonated polyethylene, a polyarylate, poly(2,6-dimethyl phenylene oxide), polyvinyl chloride and its copolymers, polyphenylene sulfide and a polyacetal.

9. A composition as defined in claim 8 wherein the thermoplastic polymer is a polysulfone.

10. A composition as defined in claim 8 wherein the thermoplastic polymer is a polyhydroxyether.

11. A composition as defined in claim 7 wherein the thermoplastic polymer is a polycarbonate.

12. A composition as defined in claim 7 wherein the thermoplastic polymer is a polyetherimide.

13. The composition of claim 1 wherein said cycloaliphatic epoxide is bis(2,3-epoxycyclopentyl) ether.

14. An epoxy composition comprising:

(a) from 20 to 90 wt % of a cycloaliphatic epoxide containing two or more epoxide groups;

(b) from 1 to about 80 wt % of a modifier selected from the group consisting of compounds of the formula

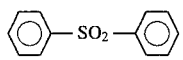
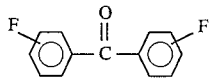
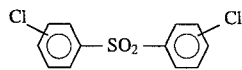
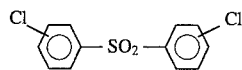
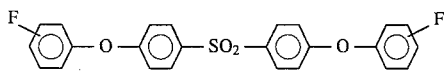

(c) from 5 to 80 wt % of an epoxy hardener;

(d) up to 20 wt % of a thermoplastic polymer; and (e) up to 85 wt % of a structural fiber.

15. In a composition comprising from 20 to 90 wt % of a cycloaliphatic epoxy resin, from 5 to 80 wt % of an epoxy curing agent, up to 20 wt % of a thermoplastic polymer and up to 85 wt % of a structural fiber, the improvement wherein said composition further comprises from 1 to about wt % of a modifier selected from the group consisting of compounds of the formula

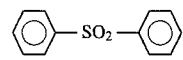
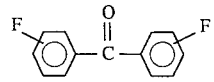
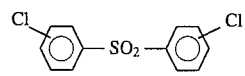
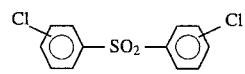
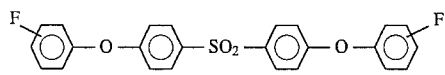

16. The composition of claim 15 wherein said cycloaliphatic epoxy resin is selected from the group consisting of bis(2,3-epoxycyclopentyl) ether, 4-(1,2-epoxyethyl)-1,2-epoxycyclohexane, 3,4-epoxycyclohexylmethyl 3,4-epoxycyclohexane carboxylate, 1,4-cyclohexadiene diepoxide, 2-(3,4-epoxycyclohexyl-5,5-spiro-3,4-epoxy)cyclohexane meta-dioxane, bis(3,4-epoxycyclohexyl) ether, a diepoxide of vinyl cyclopentenyl ether, a diepoxide of allyl cyclopentenyl ether, and mixtures thereof.

* * * * *